United States Patent [19]

Marchionni et al.

[11] Patent Number: 5,777,174
[45] Date of Patent: Jul. 7, 1998

[54] PROCESS FOR PREPARING PERFLUOROPOLYETHERS WITH BROMO- OR IODO-CONTAINING END GROUPS

[75] Inventors: Giuseppe Marchionni, Milan; Pier Antonio Guarda, Nole, both of Italy

[73] Assignee: Ausimont S.p.A., Milan, Italy

[21] Appl. No.: 845,146

[22] Filed: Apr. 21, 1997

[30] Foreign Application Priority Data

Apr. 23, 1996 [IT] Italy .................. MI96A0798

[51] Int. Cl.$^6$ .................................................. C07C 41/01
[52] U.S. Cl. .................... 568/615; 568/604; 568/591; 568/614; 204/157.63; 525/326.4
[58] Field of Search .......................... 568/615, 604, 568/591, 614; 204/157.63; 525/326.4

[56] References Cited

U.S. PATENT DOCUMENTS

| | | |
|---|---|---|
| 3,810,874 | 5/1974 | Mitsch et al. ............... 260/75 |
| 4,853,097 | 8/1989 | Marchionni et al. ......... 204/157.6 |
| 4,973,762 | 11/1990 | Tohzuka et al. ............. 568/615 |
| 5,144,092 | 9/1992 | Marchionni et al. ......... 568/615 |
| 5,155,282 | 10/1992 | Marchionni et al. ......... 568/615 |
| 5,288,376 | 2/1994 | Oyama et al. ............... 204/157.63 |

*Primary Examiner*—Gary Geist
*Assistant Examiner*—Sreeni Padmanaphan
*Attorney, Agent, or Firm*—Nikaido Marmelstein Murray & Oram LLP

[57] ABSTRACT

Process for preparing perfluoropolyethers with bromo- or iodo- containing end groups, respectively, by subjecting a peroxidic perfluoropolyether to thermal treatment, in the absence of UV radiation, at temperatures from 120° C. to 280° C. in the presence of bromo- or iodo-containing compounds having, respectively, the following general formulas:

$$T\ T'\ T''\ C\ Br$$

wherein T, T', T'' equal to or different from each other are selected from Br, F, H or $R'_f$, wherein $R'_f$ is a perfluoroalkylic chain from 1 to 8 carbon atoms;

$$R\ R'\ R''\ C\ I$$

wherein R, R', R'', equal to or different from each other can be I (iodine), H, F, or $R'_f$, wherein $R'_f$ has the meaning indicated above.

8 Claims, No Drawings

PROCESS FOR PREPARING PERFLUOROPOLYETHERS WITH BROMO- OR IODO-CONTAINING END GROUPS

BACKGROUND OF THE INVENTION

1. Field of the Invention

The present invention relates to a method for preparing perfluoropolyethers with bromo- or iodo-containing end groups, respectively.

2. Description of the Related Art

As known, these products can be utilized as additives in rubber mixtures curable with peroxides and as removers of the fluoroelastomers molds in the case of bromo-containing products, and as intermediates useful for the synthesis of fluoro-containing resins, fluoro-containing elastomers and fluoro-containing surfactants in the case of iodo-containing products.

It is known in the art that it is possible to prepare perfluoropolyethers with bromo-containing end groups with good yields and with controlled molecular weight utilizing perfluoropolyethers having both linear and branched chain by submitting a peroxidic perfluoropolyether to photolysis with UV radiations in the presence of bromine at temperatures comprised from $-40°$ to $+130°$ C. in the presence or not of an inert solvent. See for instance U.S. Pat. No. 5,155,282. In this patent it is specified that if one works in absence of UV radiations in a wide range of temperatures, low yields in bromo-containing product are obtained and without any control of the molecular weight. The process of preparation indicated in the patent mentioned above involves therefore the utilization of UV radiations and therefore expensive processes and plants.

Other methods for preparing products with halogen containing end groups are known in the art. For instance end groups are obtained wherein the halogen can be bromine, iodine or chlorine starting from the silver salt of the perfluoropolyethers acid. See for instance U.S. Pat. No. 3,810,874.

In the patent EP 151,877 a method for preparing perfluoropolyethers with chloro- or bromo-containing end groups is described, by starting from perfluoropolyethers with hydrogen-containing end groups by reaction with chlorine or bromine to obtain chloro- or bromo-containing derivatives.

In the patent EP 348,948 one starts from acylfluoride of a perfluoropolyether and the salt is prepared by reaction with a carbonate and further reaction with iodine to obtain a perfluoropolyether with iodo-containing end groups.

In the patent EP 472,423 it is described a process similar to that of EP '948 wherein acylfluoride is reacted with a metal iodide to prepare acyliodide and subsequent treatment with UV radiations to obtain perfluoropolyether with iodo-containing end groups.

In the U.S. Pat. No. 4,853,097 in the name of the Applicant one starts from an acylfluoride of a perfluoropolyether, which is reacted with ammonia and then with hypobromite to obtain a derivative with bromo-containing end group.

In all these patents of the prior art either UV radiations are utilized which imply expensive plants or it is to be started from functionalized perfluoropolyethers requiring transformation reactions for their obtainment. Also in this case, the industrial processes which can be carried out require additional steps and therefore higher production costs.

It was felt the need to have available a process for preparing perfluoropolyethers with bromo- or iodo-containing end groups respectively, which removed the drawbacks of the known art and allowed to have a simplified and therefore less expensive process available.

SUMMARY OF THE INVENTION

The Applicant has now unexpectedly and surprisingly found that it is possible to obtain with good yields perfluoropolyethers with bromo- or iodo-containing end groups and at the same time to obtain a control of the molecular weight with the process of the invention described hereunder by starting from peroxidic perfluoropolyethers without utilizing UV radiations.

An object of the invention is a process for preparing perfluoropolyethers with bromo- or iodo-containing end groups, respectively, by submitting a peroxidic perfluoropolyether to thermal treatment, in absence of UV radiations, at temperatures comprised between $120°$ C. and $280°$ C. in the presence of bromo- or iodo-containing compounds having respectively the following general formulas:

$$T\ T'T''C\ Br$$ 

wherein T, T', T'' equal to or different from each other are selected from Br, F, H or $R'_f$, wherein $R'_f$ is a perfluoroalkylic chain from 1 to 8 carbon atoms, the case in which T=Br and T' and T'', equal to or different from each other, are Br, F, H or $R'_f$, is preferred; an even more preferred particular case is the one wherein T=T'=T''=Br;

$$R\ R'R''C\ I$$ 

wherein R, R', R'', equal to or different from each other can be I (iodine), H, F or $R'_f$, wherein $R'_f$ has the meaning indicated above, preferably R=R'=R''=I, or R=R'=H and R''=I, or R=H and R'=R''=I.

DESCRIPTION OF THE PREFERRED EMBODIMENTS

In particular the perfluoropolyether comprises repeating units statistically distributed along the chain selected from:

—$CF_2O$—, —$CF_2CF_2O$—, —$CF_2CF(CF_3)O$—, —$CF(CF_3)O$—, —$CF_2(CF_2)_zCF_2O$—, —$CF_2CF(OR_f)O$—, —$CF(OR_f)O$—.

wherein z=1 or 2, $R_f$ is —$CF_3$, —$C_2F_5$, or —$C_3F_7$.

In the case of perfluoropolyethers with iodo-containing end groups, the end groups are selected from: —$CF_2I$, —$CF_2CF_2I$, —$CFICF_3$, —$CFIOR_f$, wherein $R_f$ is defined as above; instead in the case of bromo-containing perfluoropolyethers, the bromo-containing end groups are selected from —$CF_2Br$, —$CF_2CF_2Br$, —$CFBrCF_3$ and —$CFBrOR_f$, wherein $R_f$ is defined as above.

Optionally in the products obtained with the process of the invention, both in the case of bromo- and iodo-containing end groups, also perfluoropolyether products can be present, having end groups selected from:

I) —$CF_3$, —$C_2F_5$ and —$C_3F_7$,

II) —$CF_2COF$, —$OCOF$, —$CF_2COCF_3$;

III) $ClCF_2CF(CF_3)$—, $CF_3CFClCF_2$—, $ClCF_2CF_2$—, $ClCF_2$—.

In the case of bromo-containing end groups the preferred reaction temperature is comprised between $160°$ C. and $230°$ C.; in the case of iodo-containing end groups between $130°$ C. and $180°$ C.

The average molecular weight of the product obtained with the process of the present invention can be changed depending on the starting peroxidic perfluoropolyether. In particular, the higher the content of peroxidic units of the starting product, the lower is the average molecular weight of the bromo-derivative or iododerivative obtained. This allows to adjust the molecular weight of the product obtained by changing the characteristics of the starting product. The content of peroxidic units is generally expressed as PO, defined as PO=g active oxygen/100 g of polymer, by meaning as active oxygen the oxygen atoms bound to another oxygen atom. The number average molecular weight Mn of the iodo- or bromo-containing derivatives according to the present invention is generally comprised from 400 to 4000.

In particular perfluoropolyoxyalkylenes can be selected from the following classes:

(a) T1—O($CF_2CF(CF_3)O)_a(CFXO)_b$—T2 wherein: T1 and T2 equal to or different from each other, are bromo-containing end groups of the type —$CF_2Br$, —$CFBrCF_3$ or iodo-containing end groups of the type —$CF_2I$, —$CFICF_3$ and optionally also end groups of the type I), II), III) indicated above; X is F or $CF_3$; a and b are integers such that the molecular weight is comprised in the range indicated above; a/b is comprised between 10 and 100.

(b) T3—O($CF_2CF_2O)_c(CF_2O)_d(CF_2(CF_2)_zCF_2)_h$—T4 wherein T3 and T4, equal to or different from each other, are bromo-containing end groups of the type —$CF_2Br$, —$CF_2CF_2Br$, or iodo-containing end groups of the type —$CF_2I$, —$CF_2CF_2I$, and optionally also end groups of the types I), II), III) indicated above; c, d and h are integers such that the molecular weight is comprised in the range indicated above; c/d is comprised between 0.1 and 10; h/(c+d) is comprised between 0 and 0.05.

(c) T5—O($CF_2CF(CF_3)O)_e(CF_2CF_2O)_f(CFXO)_g$—T6 wherein T5 and T6, equal to or different from each other, are bromo-containing end groups of the type —$CF_2Br$, —$CF_2CF_2Br$, —$CFBrCF_3$ or iodo-containing end groups of the type —$CF_2I$, —$CF_2CF_2I$, —$CFICF_3$, and optionally also end groups of the types I), II), III) indicated above; X is F or $CF_3$; e, f, g are integers such that the molecular weight is comprised in the range indicated above; e/(f+g) is comprised between 0.1 and 10, f/g is comprised between 2 and 10.

(d) T7—O($CF_2O)_j(CF_2CF(OR_f)O)_k(CF(OR_f)O)_l$—T8 wherein: $R_f$ is —$CF_3$, —$C_2F_5$, —$C_3F_7$; T7 and T8, equal to or different from each other, are bromo-containing end groups of the type —$CF_2Br$, —$CF_2CF_2Br$, —$CFBrOR_f$, or iodo-containing end groups of the type —$CF_2I$, —$CF_2CF_2I$, —$CFIOR_f$; and optionally also end groups of the types I), II), III) indicated above; j,k,l are integers such that the molecular weight is comprised in the range indicated above; k+l and j+k+l are at least equal to 2, k/(j+l) is comprised between 0.01 and 1000, l/j is comprised between 0.01 and 100.

The peroxidic perfluoropolyethers utilized as starting products and comprising the repeating units indicated above are well known in the art, for instance see patents U.S. Pat. No. 3,665,041, 2,242,218, 3,715,378 and patents EP 239, 123, EP 344,547, U.S. Pat. No. 5,144,092. Peroxidic perfluoropolyethers generally have number average molecular weight from 1,600 to 100,000, preferably from 3,000 to 50,000; PO is generally comprised between 0.2 and 4.0, preferably between 2 and 3.5.

With the process of the invention in the case of bromo-containing end groups, the yields are very high, of the order of 50–90% by weight, more generally of the order of 80–90% by weight. In the case of iodo-containing end groups, the yields are of about 50–70% by weight.

As already said above, to obtain perfluoropolyethers with bromo-containing end groups by the process of the present invention, the peroxidic perfluoropolyether is reacted with bromo-containing compounds of general formula T T'T"C Br as defined above.

As already said above, to obtain perfluoropolyethers with iodo-containing end groups by the process of the present invention, the peroxidic perfluoropolyether is reacted with iodo-containing compounds having the general formula R R' R"C I as defined above.

The products obtained by the process of the present invention generally comprise mixtures of alpha, omega-diiodo and monoiodo perfluoropolyethers in the case of preparation of perfluoropolyethers with iodo-containing end groups; or alpha, omega-dibromo perfluoropolyethers and monobromo perfluoropolyethers in the case of preparation of perfluoropolyethers with bromo-containing end groups.

The functionality f of the final product in bromo- or iodo-containing end groups is defined, as:

f=2 . (iodo- or bromo-containing end groups)/total end groups.

The functionality f will have the value of 2 when all the end groups are iodo- or bromo-containing end groups. From the reaction mixture it is extremely easy, if desired, to carry out the separation of the diiodo- or dibromo-containing product, for instance by chromatographic separation for instance on silica gel, from the optional perfluoropolyethers containing fluoroacylic end groups.

It is thus possible to obtain the diiodo- or dibromo-containing product with high functionality with global yields depending on the relative percentage of iodo- or bromo-containing end groups and fluoroacylic end groups obtained during the synthesis.

For instance, as regards the iodo-containing products obtained after the thermal treatment of the peroxidic perfluoropolyoxyalkylene in the presence of the iodo-containing compounds of the present invention, they are formed of alpha, omega-diiodoperfluoropolyethers in admixture with alpha-iodoperfluoropolyethers and with perfluoropolyethers not containing iodine. The end groups formed during the treatment of the peroxidic perfluoropolyether with the iodo-containing compound of the present invention are indeed only constituted by iodo-containing end groups and by end groups of acylfluoride type (—COF). Obviously in the final product are present also the original end groups of the starting peroxidic perfluoropolyether, which can be end groups of type I), II) or III), as defined above. Therefore, if a high functionality product in iodo-containing end groups is desired to be prepared, it is sufficient to start from a peroxidic perfluoropolyoxyalkylene having a sufficiently high average molecular weight so that the original end groups of the peroxidic perfluoropolyoxyalkylene are worthless. Subsequently it is sufficient to submit the mixture to chromatographic separation on silica gel or other stationary phase capable of holding the products having an acid character. In particular the end groups —COF can be hydrolyzed to end groups —COOH, for instance by reaction with water according to the methods described in U.S. Pat. No. 3,810,874, then to dissolve the mixture in a solvent and percolate the solution in a column packed with silica gel to obtain a product substantially consisting of alpha, omega-diiodoperfluoropolyethers and then having a high functionality (defined as above) in iodo-containing end groups.

Similarly this is valid also for the bromo-containing products obtained by the process of the present invention. In this case both the yield and the selectivity in alpha, omega-dibromo derived with the process of thermal treatment in the presence of the bromo-containing compound of the present invention is very high, also >90%.

As already said the products with bromo-containing end groups obtained according to the present invention can be used as removers from the fluoroelastomers molds. The fluoroelastomers processing time is thus reduced and the global productivity of the fluoroelastomers processability is therefore increased.

The product obtained with iodo-containing end groups according to the present invention is utilized as already said, as intermediate according to what previously reported.

The following examples are given for illustrative purposes and are not limitative of the scope of the present invention.

EXAMPLE 1

In a flask equipped with refrigerant and magnetic stirrer, 20.8 g of peroxidic perfluoropolyether are introduced, having structure $TO(CF_2CF_2O)_c(CF_2O)_d(O)_pT$, with p integer such as to give an average peroxidic power PO=1.93 (by PO it is meant the grams of active oxygen, 16 amu, for 100 g of polymer); c and d are integers such that the average ratio c/d=0.92 and such as to give a number average molecular weight equal to 10,000; T is equal to $CF_3$, COF. Then 8.2 g of diiodomethane ($CH_2I_2$) are added; it is kept under stirring and gradually heated up to 170° C.

It is maintained at 170° C. for two hours and then at 180° C. for five hours.

The clear higher phase is separated (17 g), the iodometric analysis shows PO=0 and the $^{19}$F-NMR analysis shows the following structure:

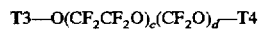

wherein T3 and T4 are —$CF_2I$, —$CF_2CF_2I$, —COF, —$CF_2COF$, and traces of end groups $CF_3$; the acid end groups/iodo-containing end groups ratio is equal to 1.5. The c/d ratio is equal to 0.62 and the number average molecular weight is equal to 1280 amu.

The so obtained product is hydrolyzed with water to transform the fluoroacylic end groups into carboxylic acid end groups; diluted then in 1,1,2-triclorotrifluoroethane it is percolated in a column packed with silica gel, in order to separate the alpha, omega-diiodo-containing products from the monoacid or diacid products. The alpha, omega-diiodo-containing products are thus quantified after distillation of the solvent and result to be 15% by weight with respect to the initial mixture. The $^{19F}$-NMR analysis shows a complete absence of acid end groups, c/d ratio equal to 0.71 and number average molecular weight equal to 1300.

The percentage of diiodo-containing compound from the reaction mixture results in strict agreement with the value determined on the basis of the assumption that the end groups are statistically distributed among the various polymeric chains.

The value determined on the basis of the probabilities results to be:

| | |
|---|---|
| alpha, omega-diiodinated | $(0.4)^2 \times 100 = 16\%$ |
| alpha, omega-diacylfluoride | $(0.6)^2 \times 100 = 36\%$ |
| alfa-iodinated, omega-acylfluoride | $2 \times 0.4 \times 0.6 \times 100 = 48\%$ |

Therefore the perfluoropolyethers comprising iodo-containing end groups result to be 64%.

EXAMPLE 2

In a flask equipped with refrigerant and magnetic stirrer, 25.6 g of peroxidic perfluoropolyether are introduced, having structure $TO(CF_2CF_2O)_c(CF_2O)_d(O)_pT$, with PO=3.18, c/d ratio=3.5 and number average molecular weight equal to 43,000; T has the meaning indicated in Example 1. Then 13.1 g of iodoform ($CHI_3$) are added, it is kept under stirring and gradually heated up to 150° C. and maintained 2 hours at this temperature.

It is cooled and the higher phase, equal to 19.1 g, is separated. The iodometric analysis shows PO=0 and the $^{19}$F-NMR analysis shows a structure similar to that of Example 1, with the acid end groups/iodo-containing end groups ratio equal to 1.2. The c/d ratio is equal to 2.23 and the number average molecular weight is equal to 980.

The mixture is submitted as in Example 1 to hydrolysis and chromatographic separation, obtaining an amount of alpha, omega-diiodoperfluoroethers equal to 20% by weight with respect to the initial mixture, having number average molecular weight equal to 950.

EXAMPLE 3

In a flask equipped with refrigerant and magnetic stirrer, 503 g of peroxidic perfluoropolyether are introduced, having structure $TO(CF_2CF_2O)_c(CF_2O)_d(O)_pT$, with PO=3.18 (therefore the peroxidic perfluoropolyether contains 1 mole of peroxidic bonds —OO—), c/d ratio=3.5 and number average molecular weight equal to 43,000; T has the meaning indicated in Example 1; the kinematic viscosity at 20° C. equal to 17,600 cSt. 101 g of carbon tetrabromide ($CBr_4$ 0.30 moles) are then introduced and then it is kept under stirring.

It is heated with oil bath at 160° C. for 3 hours, at 170° C. for 5 hours, at 180° C. for 8 hours and at 190° C. for 10 hours. During such a treatment the progressive decrease of the solid reactant ($CBr_4$) is observed until complete disappearance; at 190° C. a remarkable liquid reflux occurs in the refrigerant wherefore it is not possible to further increase the temperature in the reactor to eliminate the residual traces of peroxide. The refrigerant is then replaced by a claisen and the temperature increased up to 240° C. and maintained for 4 hours, distilling 68.7 g of product. The residue is equal to 338 g.

By iodometric analysis the PO both of the distillate and of the residue results 0.

The $^{19}$F-NMR analysis shows that both the distillate and the residue have the following structure:

wherein T3 and T4 are —$CF_2Br$, —$CF_2CF_2Br$ and traces of —$CF_2COF$ and —$CF_3$; the ratio between the end groups $CF_2Br/CF_2CF_2Br$ is equal to 90:10.

The number average molecular weight of the distillate results equal to 530, with c/d ratio=2.49 and functionality in bromo-containing end groups f=1.92; the residue has number average molecular weight equal to 1370, the c/d ratio is equal to about 2.09 and the functionality in bromo-containing end groups is equal to 1.91.

The total yield in product with bromo-containing end groups is 81% by weight.

EXAMPLE 4

With the same procedure as that utilized in Example 3, 219 g of peroxidic perfluoropolyether are introduced in the reactor, having the structure $TO(CF_2CF_2O)_c(CF_2O)_d(O)_pT$, with PO=2.04 and kinematic viscosity at 20° C. equal to 38,000 cSt, the c/d ratio is 1.7, T has the meaning of Example 1. 67 g of $CBr_4$ (0.20 moles) are added and it is heated under stirring at 180° C. for 9 hours, at 190° C. for 11 hours and at 200° C. for 4 hours. It is cooled and the solid residue is separated by filtering. The product is then treated at 230° C. for 3 hours to eliminate the peroxide traces.

177 g of product having PO=0 and structure similar to that of Example 3, are obtained. The number average molecular weight determined by $^{19F}$-NMR results equal to 1900, the c/d ratio is equal to 1.13 and the functionality in bromo-containing end groups is equal to 1.90.

EXAMPLE 5

With the same procedure as that utilized in Example 3, 521 g of the peroxidic perfluoropolyether utilized in Example 4 are introduced in the reactor. 91.5 g of $CBr_4$ (0.28 moles) are added and heated under stirring at 180° C. for 4 hours, at 190° C. for 4 hours and at 200° C. for further 4 hours and then at 210° C. for further 4 hours. The solid residue is separated by filtering and is treated at 230° C. for 4 hours to eliminate the residual peroxide traces.

480 g of product (yield 92% by weight), having PO=0 and the same structure as that of Example 3, are obtained. The number average molecular weight (via $^{19F}$-NMR) results equal to 1650 and the ratio between end groups of the type —$CF_2Br$ and —$CF_2CF_2Br$ is equal to 94:6; the c/d ratio is equal to 0.99 and the functionality in bromo-containing end groups is equal to 1.90.

EXAMPLE 6

With the same procedure as that of Example 3, 20.7 g of peroxidic perfluoropolyether are introduced in the reactor, having the structure

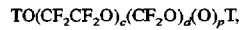

TO$(CF_2CF_2O)_c(CF_2O)_d(O)_pT$, with PO=3.7, c/d ratio=4.98 and number average molecular weight equal to 9800, T being equal to $CF_3$ and $C_2F_5$. 5.3 g of $CHBr_3$ are added and heated under stirring at 160° C. for 6 hours, at 165° C. for 15 hours, at 180° C. for 4 hours, at 190° C. for 3.5 hours, at 200° C. for 3.5 hours and at 230° C. for 4 hours. The two phases are separated and 10 g of product are discharged, having PO=0 and structure similar to that of Example 3, with T3 and e T4=—$CF_2Br$, —$CF_2$—$CF_2Br$, —$CF_2COOH$ and traces of —$CF_3$ and —$CF_2CF_3$ (deriving from the starting peroxidic perfluoropolyether), the ratio between bromo-containing end groups and —$CF_2COOH$ end groups being equal to 4.1. The number average molecular weight determined by NMR results equal to 900, the ratio between —$CF_2Br$ and —$CF_2CF_2Br$ end groups is equal to 86:14, the c/d ratio=3.5 and the functionality in brominated end groups f=1.4.

We claim:

1. Process for preparing perfluoropolyethers with bromo- or iodo-containing end groups, respectively, by subjecting a peroxidic perfluoropolyether to thermal treatment, in absence of UV radiations, at temperatures from 120° C. to 280° C. in the presence of bromo- or iodo-containing compounds having respectively the following general formulas:

T T T" C Br wherein T, T', T" equal to or different from each other are selected from Br, F, H or $R'_f$, wherein $R'_f$ is a perfluoroalkylic chain from 1 to 8 carbon atoms;

R R' R" C I wherein R, R', R", equal to or different from each other can be I, H, F or $R'_f$, wherein $R'_f$ has the meaning indicated above.

2. Process for preparing perfluoropolyethers with bromo- or iodo-containing end groups, respectively, according to claim 1, wherein in the bromo-containing compound T=Br and T' and T", equal to or different from each other, are Br, F, H or $R'_f$; wherein in the iodo-containing compound R=R'=R"=I.

3. Process for preparing perfluoropolyethers with bromo- or iodo-containing end groups, respectively, according to claim 1, wherein in the bromo-containing compound T=T'=T"=Br; and in the iodo-containing compound R=R'=H and R"=I, or R=H and R'=R"=I.

4. Process for preparing perfluoropolyethers with bromo-containing or iodo-containing end groups, respectively, according to claim 1, wherein the perfluoropolyether comprises repeating units statistically distributed along the chain, selected from: —$CF_2O$—, —$CF_2CF_2O$—, —$CF_2CF(CF_3)O$—, —$CF(CF_3)O$—, —$CF_2(CF_2)_zCF_2O$—, —$CF_2CF(OR_f)O$—, —$CF(OR_f)O$—, wherein z=1 or 2, $R_f$ is —$CF_3$, —$C_2F_5$, or —$C_3F_7$.

5. Process for preparing perfluoropolyethers with bromo- or iodo-containing end groups, respectively, according to claim 4, wherein in the case of iodo-containing end groups the iodo-containing end groups are selected from —$CF_2I$, —$CF_2CF_2I$, —$CFICF_3$, —$CFIOR_f$, wherein $R_f$ is defined as above;

in the case of bromo-containing end groups, the bromo-containing end groups are selected from —$CF_2Br$, —$CF_2CF_2Br$, —$CFBrCF_3$ and —$CFBrOR_f$, wherein $R_f$ is defined as above.

6. Process for preparing perfluoropolyethers with bromo- or iodo-containing end groups, respectively, according to claim 1, wherein in the case of bromo-containing end groups the reaction temperature is comprised between 160° C. and 230° C.; in the case of iodo-containing end groups between 130° C. and 180° C.

7. Process for preparing perfluoropolyethers with bromo- or iodo-containing end groups, respectively, according to claim 4, wherein such perfluoropolyethers having the number average molecular weight Mn of the iodo- or bromo-containing derivatives is comprised from 400 to 4000, and are selected from the following classes:

(a) T1—O$(CF_2CF(CF_3)O)_a(CFXO)_b$—T2 wherein: T1 and T2 equal to or different from each other, are bromo-containing end groups of the type —$CF_2Br$, —$CFBrCF_3$ or iodo-containing end groups of the type —$CF_2I$, —$CFICF_3$ and optionally also end groups of the type I) —$CF_3$, —$C_2F_5$ and —$C_3F_7$;

II) —$CF_2COF$, —OCOF, —$CF_2COCF_3$;

III) $ClCF_2CF(CF_3)$—, $CF_3CFClCF_2$—, $ClCF_2CF_2$—, $ClCF_2$—;

X is F or $CF_3$; a and b are integers such that the molecular weight is comprised in the range indicated above; a/b is comprised between 10 and 100;

(b) T3—O$(CF_2CF_2O)_c(CF_2O)_d(CF_2(CF_2)_zCF_2)_h$—T4 wherein T3 and T4, equal to or different from each other, are bromo-containing end groups of the type —$CF_2Br$, —$CF_2CF_2Br$, or iodo-containing end groups of the type —$CF_2I$, —$CF_2CF_2I$, and optionally also end groups of the types I), II), III) indicated above; c, d and h are integers such that the molecular weight is comprised in the range indicated above; c/d is comprised between 0.1 and 10; h/(c+d) is comprised between 0 and 0.05, wherein z=1 or 2;

(c) T5—O(CF$_2$CF(CF$_3$)O)$_e$(CF$_2$CF$_2$O)$_f$(CF.XO)$_g$—T6 wherein T5 and T6, equal to or different from each other, are bromo-containing end groups of the type —CF$_2$Br, —CF$_2$CF$_2$Br, —CFBrCF$_3$ or iodo-containing end groups of the type —CF$_2$I, —CF$_2$CF$_2$I, —CFICF$_3$, and optionally also end groups of the types I), II), III) indicated above; X is F or CF$_3$; e, f, g are integers such that the molecular weight is comprised in the range indicated above; e/(f+g) is comprised between 0.1 and 10, f/g is comprised between 2 and 10;

(d) T7—O(CF$_2$O)$_j$(CF$_2$CF(OR$_f$)O)$_k$(CF(OR$_f$)O)$_l$—T8 wherein: R$_f$ is —CF$_3$, —C$_2$F$_5$, —C$_3$F$_7$; T7 and T8, equal to or different from each other, are bromo-containing end groups of the type —CF$_2$Br, —CF$_2$CF$_2$Br, —CFBrOR$_f$, or iodo-containing end groups of the type —CF$_2$I, —CF$_2$CF$_2$I, —CFIOR$_f$; and optionally also end groups of the types I), II), III) indicated above; j,k,l are integers such that the molecular weight is comprised in the range indicated above; k+l and j+k+l are at least equal to 2, k/(j+l) is comprised between 0.01 and 1000, l/j is comprised between 0.01 and 100.

8. Process for preparing perfluoropolyethers with bromo- or iodo-containing end groups, respectively, according to claim 7, wherein the obtained product is submitted to chromatographic separation on silica gel.

* * * * *